US008464846B2

(12) United States Patent
Andersen et al.

(10) Patent No.: US 8,464,846 B2
(45) Date of Patent: Jun. 18, 2013

(54) RESTRAINING ARMS FOR WHEEL CHOCKS

(75) Inventors: Jonathan Andersen, Racine, WI (US);
Eric D. Bublitz, Franklin, WI (US);
Timothy Cotton, Milwaukee, WI (US);
Kurt Lessard, S Milwaukee, WI (US);
Pamala Pietrangelo, Oak Creek, WI (US); Benjamin Wieberdink, Cedar Grove, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 686 days.

(21) Appl. No.: 12/042,191

(22) Filed: Mar. 4, 2008

(65) Prior Publication Data
US 2009/0223764 A1 Sep. 10, 2009

(51) Int. Cl.
*B60T 3/00* (2006.01)
(52) U.S. Cl.
USPC .......................................... 188/32
(58) Field of Classification Search
USPC ........................ 188/4 R, 5, 23, 32
See application file for complete search history.

(56) References Cited

U.S. PATENT DOCUMENTS

| 1,102,773 A | 7/1914 | Martin |
| 2,413,744 A | 1/1947 | Carter |
| 2,773,564 A | 12/1956 | Garard, Sr. |
| 2,858,905 A | 11/1958 | Fahland |
| 3,110,466 A | 11/1963 | O'Sullivan |
| 3,221,907 A | 12/1965 | O'Sullivan |
| 3,305,049 A | 2/1967 | Willey |
| 3,447,639 A | 6/1969 | Parr |
| 3,542,157 A | 11/1970 | Noah |
| 3,666,118 A | 5/1972 | Raynes et al. |
| 3,667,160 A | 6/1972 | Salloum |
| 3,797,410 A | 3/1974 | Blunden |
| 4,013,145 A | 3/1977 | Mumm |
| 4,024,820 A | 5/1977 | Hlinsky et al. |
| 4,122,629 A | 10/1978 | Rennick |
| 4,146,888 A | 3/1979 | Grunewald et al. |
| 4,191,503 A | 3/1980 | Neff et al. |

(Continued)

FOREIGN PATENT DOCUMENTS

| CA | 1308222 | 10/1992 |
| CA | 2164737 | 6/1997 |
| CA | 2164738 | 6/1997 |
| DE | 583404 | 9/1933 |
| DE | 2735826 | 2/1979 |

(Continued)

OTHER PUBLICATIONS

International Bureau, "International Preliminary Report on Patentability," issued in connection with international application serial No. PCT/US2009/035137, issued Sep. 7, 2010, 9 pages.

(Continued)

*Primary Examiner* — Robert A Siconolfi
*Assistant Examiner* — Stephen Bowes
(74) *Attorney, Agent, or Firm* — Hanley, Flight & Zimmerman, LLC

(57) ABSTRACT

Wheel restraints for restraining vehicles at loading docks are described herein. An example wheel restraint includes a restraining arm to anchor a wheel chock to a fixed point at the dock. When in a blocking position, the chock rests directly upon the dock's driveway without the chock having to engage additional hardware that could be an obstruction to snow removal. In some examples, the wheel chock automatically swings between its blocking and release positions in response to the arm simply lowering or raising the chock.

29 Claims, 9 Drawing Sheets

U.S. PATENT DOCUMENTS

| | | | |
|---|---|---|---|
| 4,207,019 | A | 6/1980 | Cone |
| 4,208,161 | A | 6/1980 | Hipp et al. |
| 4,216,724 | A | 8/1980 | Grillet |
| 4,264,259 | A | 4/1981 | Hipp |
| 4,267,748 | A | 5/1981 | Grunewald et al. |
| 4,282,621 | A | 8/1981 | Anthony et al. |
| 4,373,847 | A | 2/1983 | Hipp et al. |
| 4,379,354 | A | 4/1983 | Hahn et al. |
| 4,443,150 | A | 4/1984 | Hahn et al. |
| 4,472,099 | A | 9/1984 | Hahn et al. |
| 4,560,315 | A | 12/1985 | Hahn |
| 4,572,080 | A | 2/1986 | Williams et al. |
| 4,605,353 | A | 8/1986 | Hahn et al. |
| 4,634,334 | A | 1/1987 | Hahn et al. |
| 4,653,967 | A | 3/1987 | Isaksson et al. |
| 4,674,929 | A | 6/1987 | Blunden |
| 4,674,941 | A | 6/1987 | Hageman |
| 4,676,344 | A | 6/1987 | Locicero |
| 4,679,974 | A | 7/1987 | Blunden |
| 4,695,216 | A | 9/1987 | Erlandsson |
| 4,728,242 | A | 3/1988 | Erlandsson |
| 4,759,678 | A | 7/1988 | Hageman |
| 4,765,792 | A | 8/1988 | Cherry et al. |
| 4,767,254 | A | 8/1988 | Kovach et al. |
| 4,784,567 | A | 11/1988 | Hageman et al. |
| 4,815,918 | A | 3/1989 | Bennett et al. |
| RE32,968 | E | 6/1989 | Hahn |
| 4,854,790 | A | 8/1989 | Andre |
| 4,861,217 | A | 8/1989 | Erlandsson |
| 4,865,508 | A | 9/1989 | Carlson |
| RE33,154 | E | 1/1990 | Hahn et al. |
| 4,915,568 | A | 4/1990 | West |
| RE33,242 | E | 6/1990 | Hipp et al. |
| 4,938,647 | A | 7/1990 | Erlandsson |
| 4,963,068 | A | 10/1990 | Gelder |
| 4,969,792 | A | 11/1990 | Ellis et al. |
| 4,973,213 | A | 11/1990 | Erlandsson |
| 4,979,856 | A | 12/1990 | Blunden et al. |
| 5,037,255 | A | 8/1991 | Bullock et al. |
| 5,096,021 | A | 3/1992 | Tart |
| 5,249,905 | A | 10/1993 | Warner et al. |
| 5,302,063 | A | 4/1994 | Winsor |
| 5,375,965 | A | 12/1994 | Springer et al. |
| 5,464,076 | A | 11/1995 | Benedetto, Jr. |
| 5,531,557 | A | 7/1996 | Springer |
| 5,547,045 | A | 8/1996 | Stutzman |
| 5,582,498 | A | 12/1996 | Springer et al. |
| 5,655,631 | A | 8/1997 | Richardson |
| 5,685,397 | A | 11/1997 | Maddox et al. |
| 5,689,981 | A | 11/1997 | DeLuca et al. |
| 5,692,402 | A | 12/1997 | Clements |
| 5,709,518 | A | 1/1998 | Alexander et al. |
| 5,711,110 | A | 1/1998 | Williams |
| 5,743,697 | A | 4/1998 | Alexander |
| 5,762,459 | A | 6/1998 | Springer et al. |
| 5,896,957 | A | 4/1999 | Berends et al. |
| 5,908,274 | A | 6/1999 | Silberman |
| 5,934,857 | A | 8/1999 | Alexander |
| 6,082,952 | A | 7/2000 | Alexander |
| 6,092,970 | A | 7/2000 | Hahn et al. |
| 6,123,496 | A | 9/2000 | Alexander |
| 6,199,668 | B1 | 3/2001 | Gorza et al. |
| 6,238,163 | B1 | 5/2001 | Springer et al. |
| 6,250,432 | B1 | 6/2001 | Hageman et al. |
| 6,276,496 | B1 | 8/2001 | Hageman et al. |
| RE37,570 | E | 3/2002 | Springer et al. |
| 6,357,987 | B1 | 3/2002 | Palus |
| 6,371,253 | B1 | 4/2002 | Berends et al. |
| 6,505,713 | B1 | 1/2003 | Paul et al. |
| 7,032,720 | B2 * | 4/2006 | Jette et al. ......... 188/36 |
| 7,264,092 | B2 * | 9/2007 | Jette ............... 188/36 |
| 2006/0051196 | A1 | 3/2006 | McDonald |
| 2006/0145460 | A1 * | 7/2006 | Eriksson ......... 280/765.1 |
| 2006/0207210 | A1 | 9/2006 | Kroeger |

FOREIGN PATENT DOCUMENTS

| | | |
|---|---|---|
| DE | 205852 | 1/1984 |
| DE | 3830891 | 3/1990 |
| DE | 4120035 | 12/1992 |
| DE | 4119480 | 1/1993 |
| DE | 4242415 | 2/1994 |
| DE | 4401653 | 10/1995 |
| DE | 4427406 | 10/1995 |
| EP | 0284532 | 9/1988 |
| EP | 0302356 | 2/1989 |
| EP | 0366571 | 5/1990 |
| EP | 0357087 | 7/1990 |
| EP | 0384850 | 8/1990 |
| EP | 0442245 | 8/1991 |
| EP | 0537075 | 4/1993 |
| EP | 0580415 | 1/1994 |
| EP | 0639488 | 2/1995 |
| EP | 0775653 | 5/1997 |
| EP | 1095880 | 2/2001 |
| EP | 1717172 | 11/2006 |
| FR | 1469877 | 2/1967 |
| FR | 2284481 | 4/1976 |
| FR | 2394423 | 1/1979 |
| FR | 2652340 | 9/1989 |
| FR | 2672578 | 8/1992 |
| FR | 2689845 | 10/1993 |
| FR | 2736336 | 1/1997 |
| IT | 526008 | 5/1955 |
| JP | 60036230 | 2/1985 |
| NL | 157253 | 6/1968 |
| SU | 1036593 | 8/1983 |
| WO | 95/18029 | 7/1995 |
| WO | 96/12665 | 5/1996 |
| WO | 97/02201 | 1/1997 |
| WO | 97/44220 | 11/1997 |
| WO | 97/49627 | 12/1997 |
| WO | 2004078618 | 9/2004 |
| WO | 2009014815 | 1/2009 |

OTHER PUBLICATIONS

International Searching Authority, "International Search Report," issued in connection with counterpart international application serial No. PCT/US2009/035137, mailed May 6, 2009, 5 pages.

International Searching Authority, "Written Opinion of the International Searching Authority," issued in connection with counterpart international application serial No. PCT/US2009/035137, mailed May 6, 2009, 8 pages.

Photographs of Combar Wheel-Restraint Product, taken in Nov. 1991 (2 pages).

Dyna Seal B.V., Brochure of Load and Unload Safely with the Dyna Seal Wheelblocker, Jan. 1993 (8 pages—with 4 pages of the original brochure in Dutch language and 4 pages of the English language translation).

Photographs of Kelley Auto-Chock Installation at Ford Detroit Parts Facility, taken in Jun. 1991 (2 pages).

Kelley, Brochure of Kelley Auto Chock Truck Restraint, Jan. 1991 (2 pages).

Pentalift, Inc., Drawings of Proposed Penta-Chock Installation for Coca-Cola, Mar. 6, 1991 (2 pages).

Super Seal Mfg. Ltd., Super Seal Dock Seals Catalog 11160/SU, received by the United States Patent and Trademark Office on Aug. 29, 1989 (8 pages).

Photograph of Wheel Restraint installed at Unilever near Moscow, Russia, Installation observed and Photograph taken on Mar. 1, 2007 (1 page).

European Patent Office, "Office Communication," issued in connection with European application serial No. 09 716 803.3, issued Dec. 5, 2011, 3 pages.

Canadian Intellectual Propety Office, "Office Action," issued in connection with application serial No. 2,717,403, issued Jan. 9, 2012, 4 pages.

Canadian Intellectual Propety Office, "Notice of Allowance," issued in connection with application serial No. 2,717,403, issued Oct. 5, 2012, 1 page.

* cited by examiner

RESTRAINING ARMS FOR WHEEL CHOCKS

FIELD OF THE DISCLOSURE

The subject invention generally pertains to restraining vehicles at loading docks and more specifically to restraining arms for wheel chocks.

BACKGROUND

When a truck, trailer, or some other vehicle is parked at a loading dock, often some sort of vehicle restraint is used to keep the truck from inadvertently moving away from an elevated platform of the dock. This allows a forklift truck to safely drive between the dock platform and the truck for the purpose of loading or unloading the cargo inside the truck.

There are a variety of vehicle restraints available that can be installed at a loading dock for engaging a truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint. Moreover, ICC bars are not prevalent outside the United States, so in those cases a wheel restraint can be used for blocking one or more of the truck's wheels.

Perhaps the most common wheel restraint is simply a wheel chock that wedges between the driveway and the underside of the wheel. However, wheel chocks often slip out of position on driveways that are slippery due to oil, rain, ice, sand, gravel, or dirt. Moreover, wheel chocks usually are loose items that do not permanently attach to the loading dock area, so they often get misplaced.

DESCRIPTION OF THE PREFERRED EXAMPLES

Figure 1:
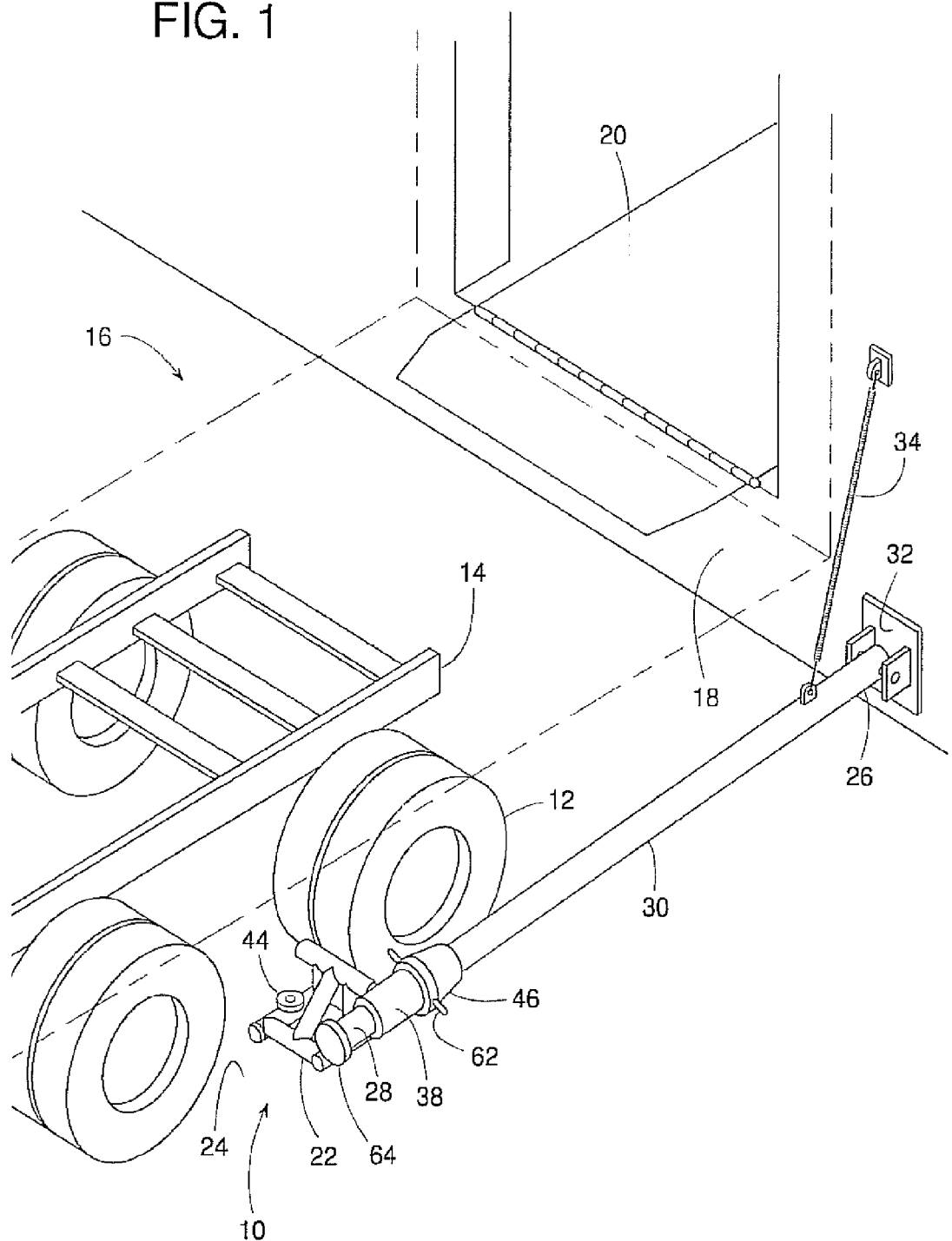
FIG. 1 is a perspective view an example wheel restraint showing the restraint in a blocking position.
Figure 2:
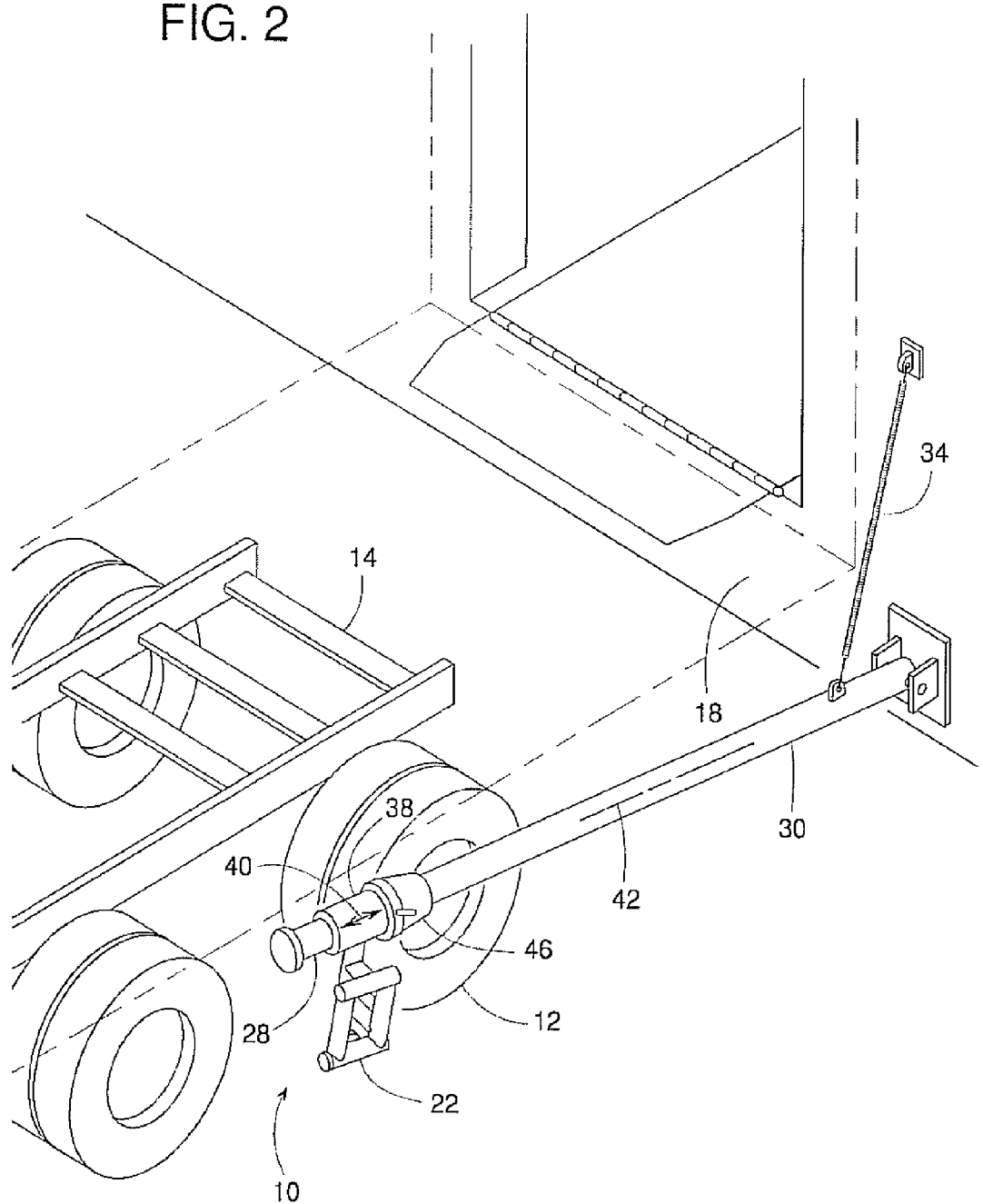
FIG. 2 is a perspective view of the example wheel restraint of FIG. 1 but showing the restraint in a release position.
Figure 3:
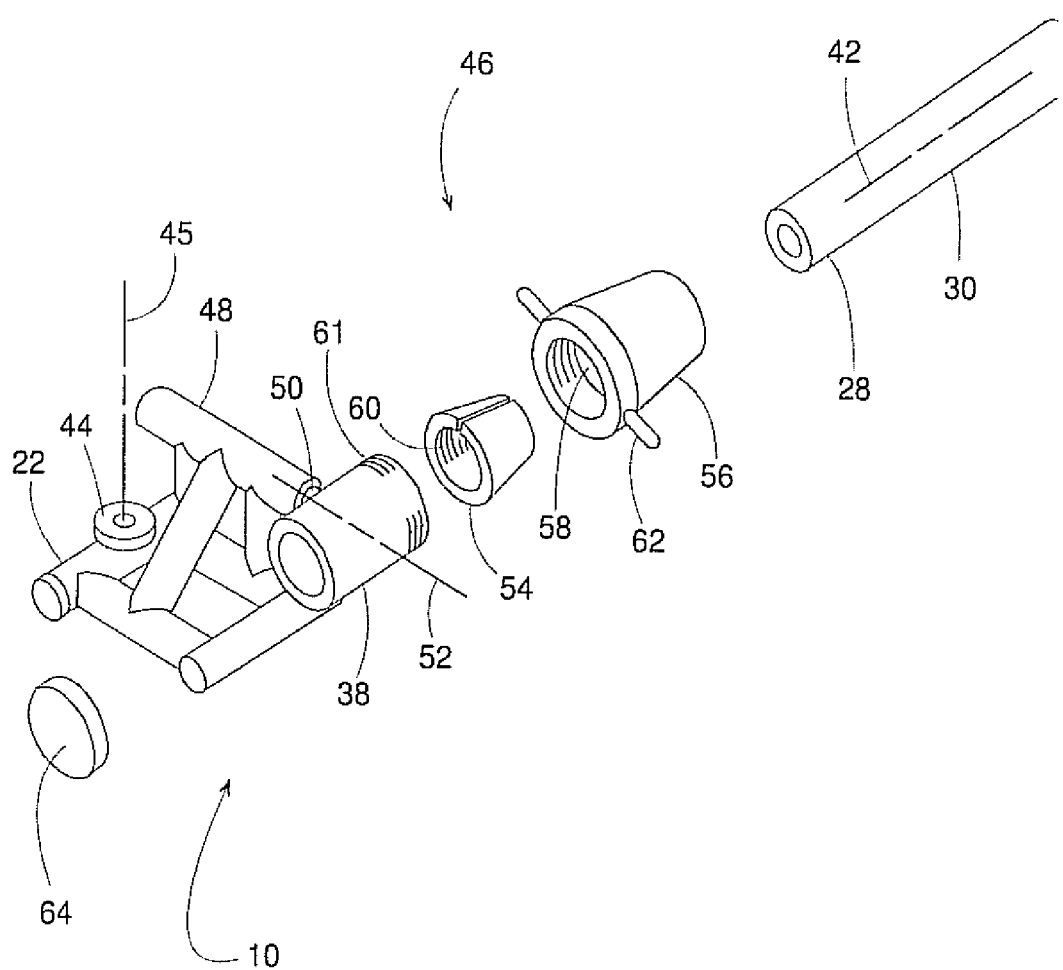
FIG. 3 is an exploded view of the example wheel restraint of FIGS. 1 and 2.

FIGS. 1-3 show a wheel restraint 10 for restraining at least one wheel 12 of a vehicle 14 at a loading dock 16. Restraint 10 is shown in a blocking position in FIG. 1 and is shown in a release position in FIG. 2. As used herein, a "blocking position" is one of a range of positions in which restraint 10 helps hold or restrain vehicle 14 adjacent a dock face 18 by providing a barrier in front of wheel 12 so that cargo can be safely conveyed on and off of vehicle 14. Similarly, as used herein, "release position" refers to a range of positions of restraint 10 in which the restraint 10 is not providing a barrier to movement of wheel 12. In some cases, a dock leveler 20 may be used to facilitate the loading and unloading operations. An upper section of vehicle 14 is shown in phantom lines to more clearly show the subject example wheel restraint.

Wheel restraint 10 includes a wheel chock 22 that can rest upon a driveway 24 of dock 16 to block wheel 12 when restraint 10 is in the blocking position as shown in FIG. 1. To limit or define the wheel chock's horizontal movement (particularly in a forward direction away from dock face 18) and to assist the repositioning of chock 22 between the blocking and release positions, an arm 30 couples chock 22 to an anchor 32 that is attached to dock 16. A proximal end 26 of arm 30 is pivotally attached to anchor 32 so that arm 30 is capable of movement between an extended position (as in FIG. 1) and a generally vertical storage orientation adjacent dock face 18, although other storage positions are possible.

Figure 6:
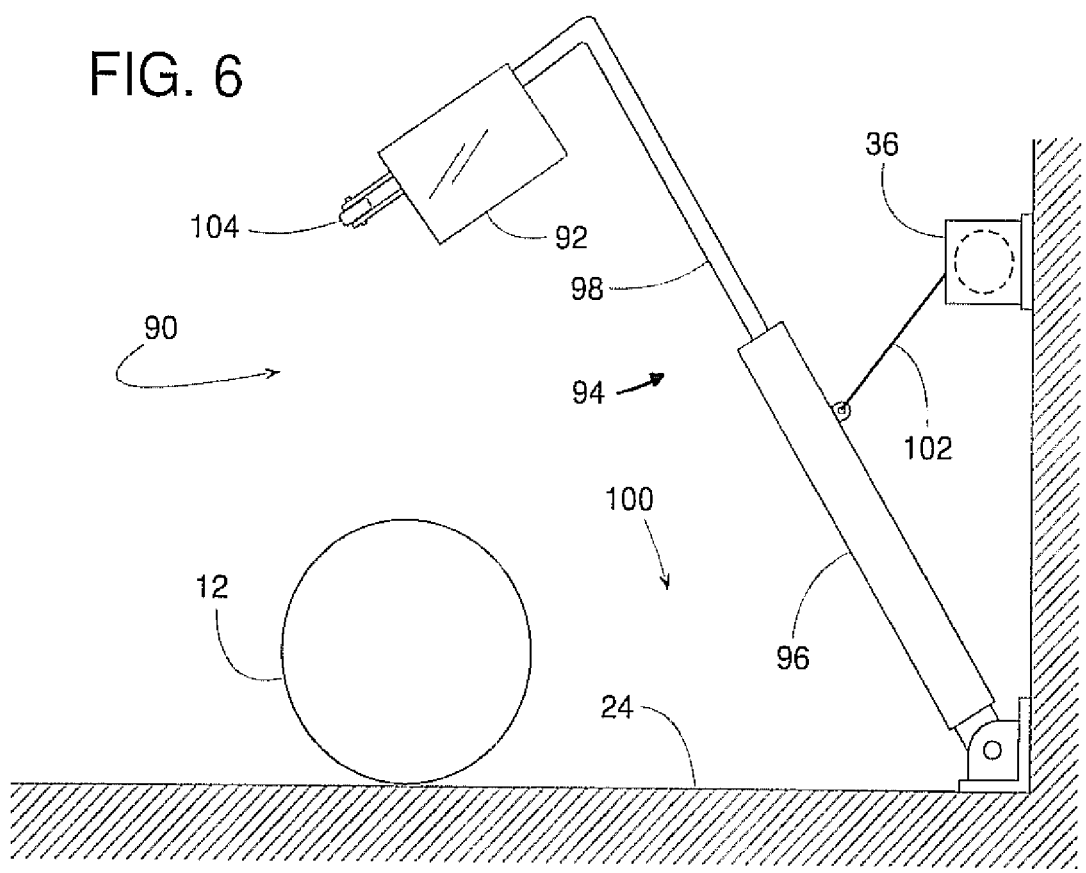
FIG. 6 is a side view of yet another example wheel restraint showing a wheel chock in a released position.

Typical operation might begin with vehicle 14 backing over driveway 24 while restraint 10 is in a release position. In the release position, a distal end 28 of arm 30 can be slightly raised as shown in FIG. 2, or arm 30 could be raised even higher to a more upright, stored position. A tension spring 34 or some other type of counterbalance or lifting mechanism (e.g., a winch 36 of FIG. 6) can be used to lift or at least offset the weight of arm 30 (or arm 68 in FIG. 4) and chock 22. With arm 30 sufficiently raised, a mounting sleeve 38 on arm 30 allows chock 22 to hang pendant so that chock 22 is clear of the vehicle's path of travel.

Once vehicle 14 is properly parked adjacent dock face 18, sleeve 38 can be manually slid in a direction indicated by arrow 40 or otherwise moved axially along a longitudinal axis 42 of arm 30 to position chock 22 ahead of wheel 12. To assist the translation of chock 22 along arm 30, chock 22 includes a friction-reducing structure, illustratively in the form of a roller 44 that is rotatable about an axis 45 perpendicular to axis 42. Roller 44 helps support the weight of arm 30 and chock 22 as roller 44 rolls along driveway 24 to facilitate movement over driveway 24, which may be uneven or have a rough surface. In other examples, any other suitable rollers or friction-reducing structures may be used.

After chock 22 is moved to a position that is more forward than wheel 12 (as shown in FIG. 2), distal end 28 of arm 30 is lowered and chock 22 rotates around directly in front of wheel 12 (as shown in FIG. 1). Sleeve 38 allows chock 22 to rotate about longitudinal axis 42 of arm 30. The ability of chock 22 to rotate about the longitudinal axis 42 allows chock 22 to be moved between a release position and a blocking position relative to wheel 12 without the necessity of arm 30 having itself to be capable of lateral movement toward and away from wheel 12. This in turn may allow arm 30 to be mounted to dock face 18 so that pivoting of arm 30 about only one axis is needed—since a degree of freedom of arm 30 is not needed to translate chock 22 from outboard of wheel 22 to in front of or blocking wheel 12.

Figure 3A:
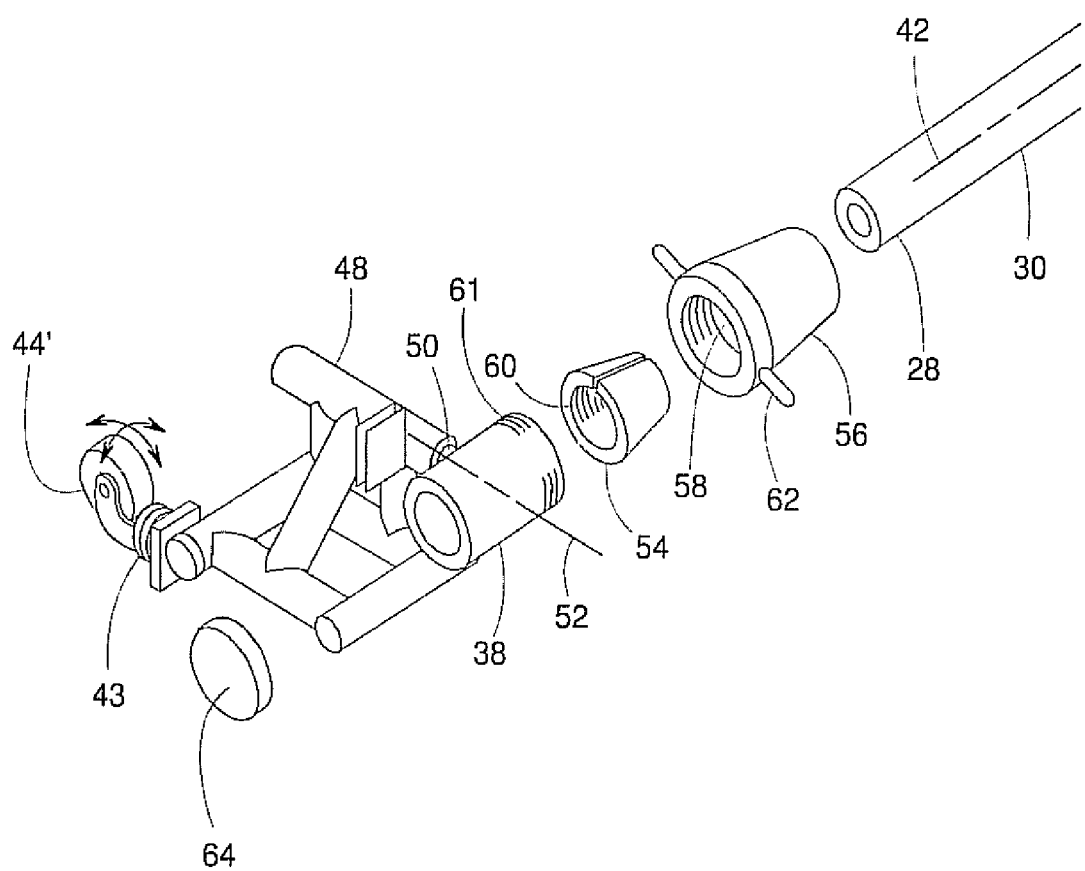
FIG. 3A is an exploded view similar to FIG. 3 but showing another example wheel restraint having a swivel roller instead of a fixed roller.

To facilitate the movement of chock 22 from a release position to a blocking position resulting from the rotation about axis 42 of arm 30, a friction-reducing structure, illustratively in the form of a roller on a swivel mounting 43, may be included. Such a structure is detailed in FIG. 3A with reference number 44'. A prime designation is used as roller 44' may still serve the function of the previously-referenced roller 44 by facilitating longitudinal movement of chock 22 relative to axis 42 of arm 30, but roller 44' also facilitates rotation of chock about that same axis 42. As arm 30 is lowered, roller 44' engages the driveway and bears at least some of the weight of chock 22. Chock 22 can now easily be manipulated to move over the driveway toward wheel 12 as it rotates about axis 42. In the absence of a structure like 44', an operator rotating chock 22 about axis 40 would have to manipulate the entire weight of chock 22. If this is required for manual operation, chock 22 may be provided with a handle to facilitate the movement. Once directly in front of wheel 12, chock 22 can be slid tightly up against the wheel if desired. To block the vehicle's forward movement, a collet clamp 46, or some other locking mechanism, can be tightened to clamp or lock wheel chock 22 to arm 30. This enables restraint 10 to resist forward movement of vehicle 14 by exerting a reaction force that arm 30 transmits to anchor 32.

To release vehicle 14, clamp 46 is loosened and chock 22 is swung out from its blocking position. Moving chock 22 can be done under power or done manually by simultaneously lifting arm 30 and rotating chock 22 from their positions of FIG. 1 to that of FIG. 2 as facilitated by lifting mechanism/counterbalance spring 34 and roller 44 or 44'. Once vehicle 14 is released, arm 30 can be left in the position of FIG. 2 or raised farther to an upright storage position.

Referring to FIG. 3, although the structural details of restraint 10 may vary, in some examples, chock 22 comprises a fabrication of metal tubes. One tube provides a journal bearing 48 that receives a shaft 50 extending from sleeve 38. Bearing 48 and shaft 50 allow chock 22 to rotate about an axis 52 that is generally perpendicular to longitudinal axis 42. To selectively hold and release sleeve 38 to arm 30, collet clamp 46 comprises a tapered split ring collet 54 that fits at least partially within a nut 56 that includes a similarly tapered surface 58. Upon screwing nut 56 onto a threaded end 61 of sleeve 38, surface 58 forces collet 54 to constrict tightly around arm 30, thus clamping sleeve 38 to arm 30. Teeth 60 on collet 54 can increase the holding force between collet 54 and arm 30. Ears 62 extending from nut 56 provide a gripper surface for manually tightening and loosening nut 56. A cap 64 attached to distal end 28 of arm 30 to prevent sleeve 38 from accidentally sliding off or disengaging from the end of arm 30.

Figure 4:
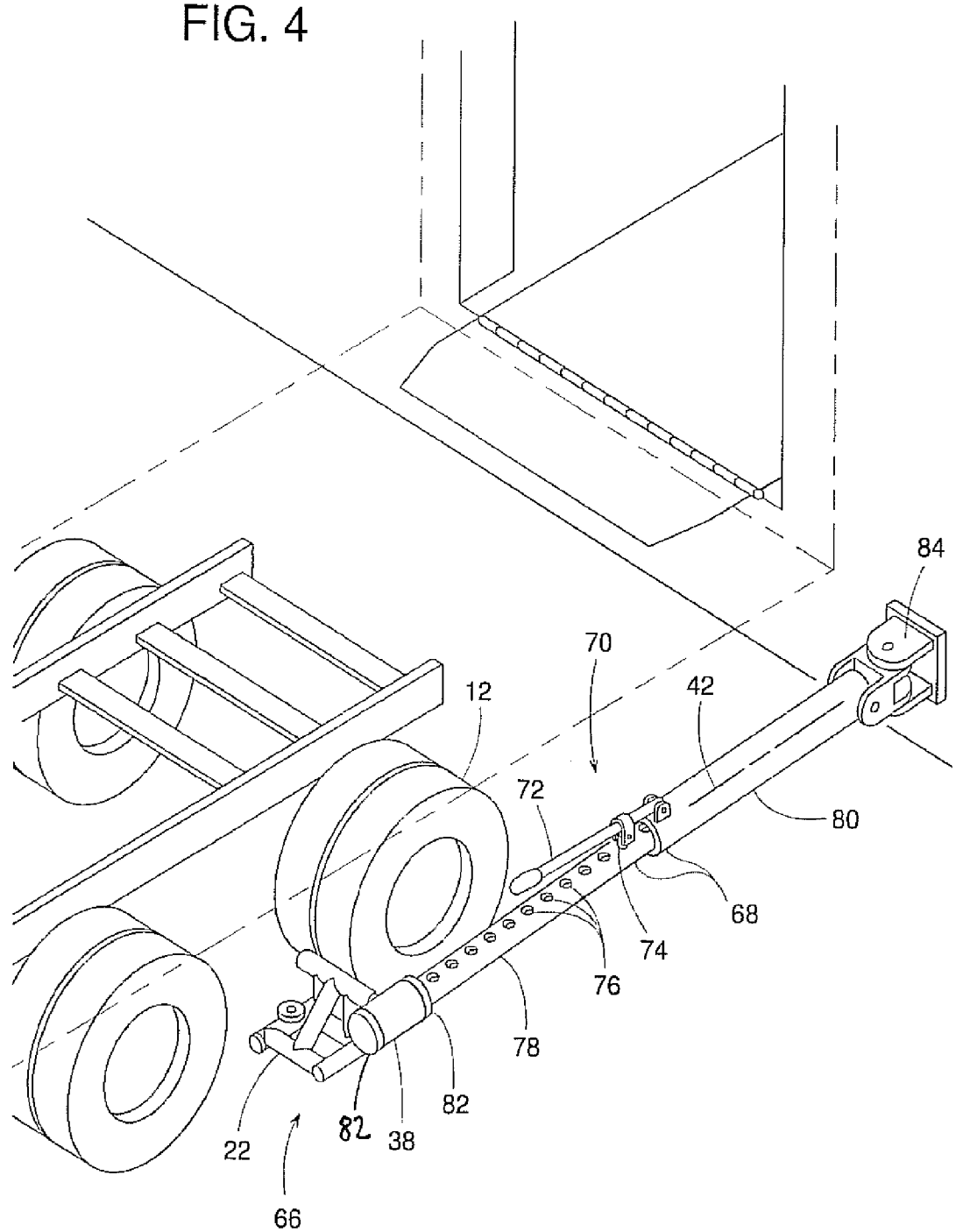
FIG. 4 is a perspective view yet another example wheel restraint in a blocking position.
Figure 5:
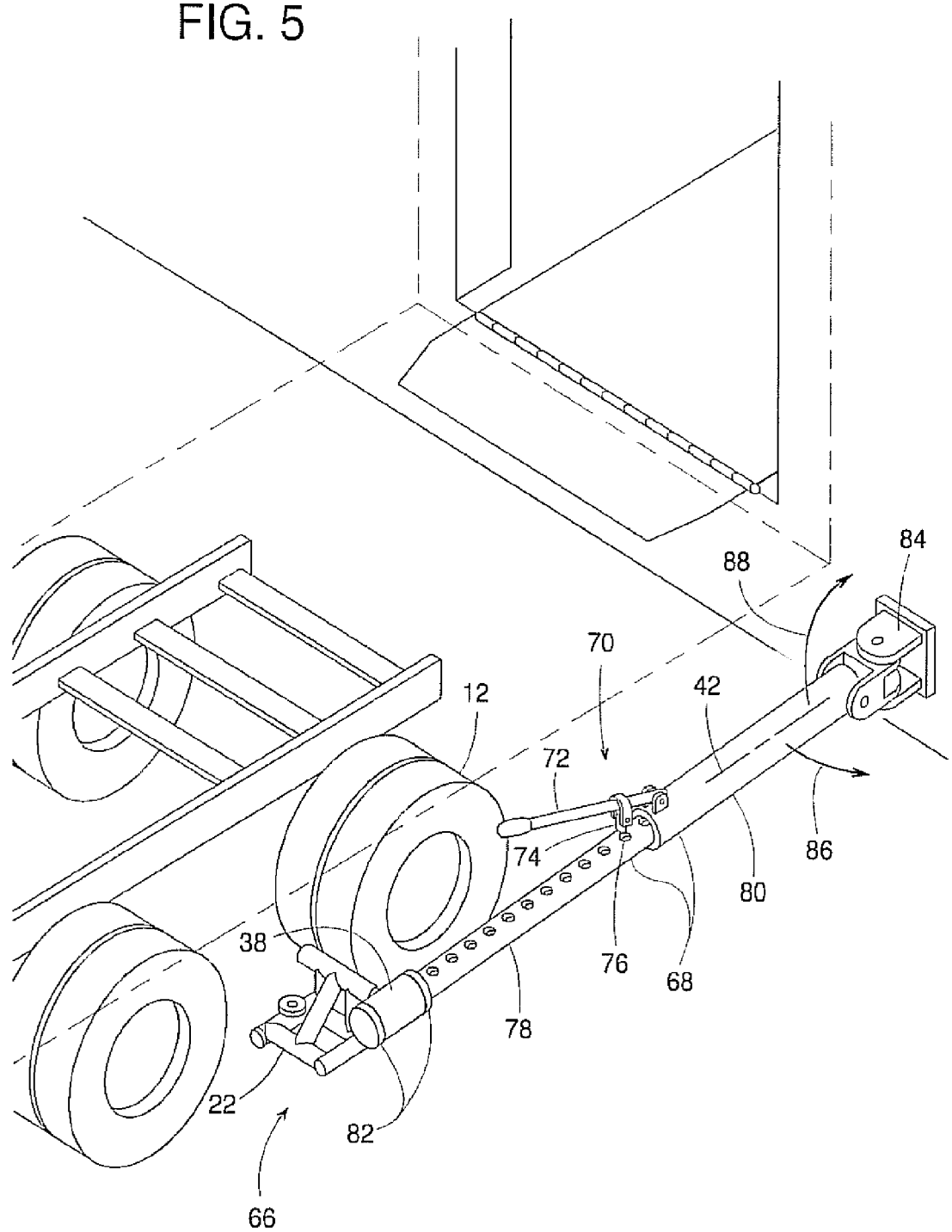
FIG. 5 is a perspective view of the example restraint of FIG. 4 but showing the arm in an unlocked position.

FIGS. 4 and 5 illustrate another example wheel restraint 66. In the illustrated example, chock 22 is mounted to a distal end of an axially extendible telescopic arm 68. While a variety of mechanisms for selectively fixing and adjusting the length of arm 68 are possible, here a detent mechanism 70 on arm 68 selectively locks and releases the extension of arm 68. In a locked state, shown in FIG. 4, a lever 72 lowers a pin 74 into a selected hole 76 to lock a first shaft 78 to a second shaft 80 of arm 68, thereby fixing the length of arm 68. The axial position of chock 22 is also fixed because collars 82 at each end of sleeve 38 on shaft 78 retain sleeve 38 at the distal end of arm 30, while allowing rotation of chock 22 relative to shaft 78. In the unlocked state, shown in FIG. 5, lever 72 is pivoted upward to lift pin 74 out from within any of holes 76. With pin 74 disengaged, shaft 78 is free to move or slide (e.g., slide in and out) relative to shaft 80 to vary the length of arm 68 and, thus, adjust the axial position of chock 22.

To move chock 22 in or out of a blocking position in front of wheel 12, arm 68 and chock 22 may be moved in the same manner as restraint 10, (i.e., arm 68 pivots upward in a direction indicated by arrow 88, while sleeve 38 allows chock 22 to rotate about axis 42). Alternatively, or in addition, a universal anchor 84 could allow arm 68 to swing chock 22 horizontally, in a direction indicated by arrow 86.

Figure 7:
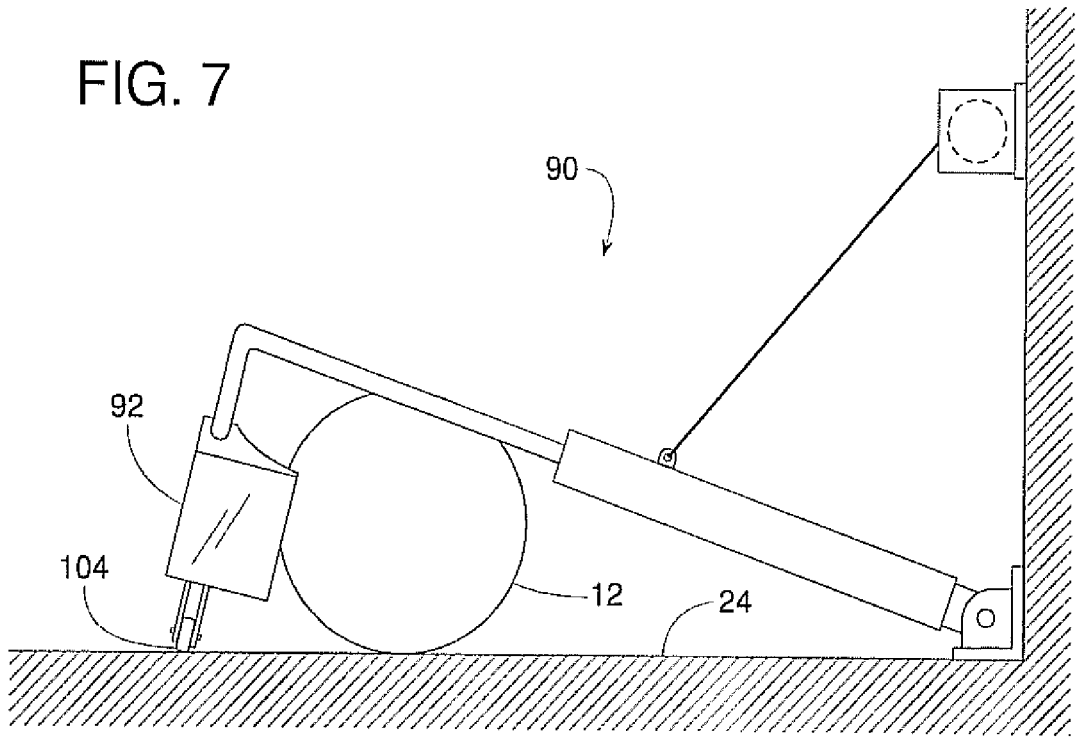
FIG. 7 is a side view of the example wheel restraint of FIG. 6 but showing the wheel chock at a lower elevation.
Figure 8:
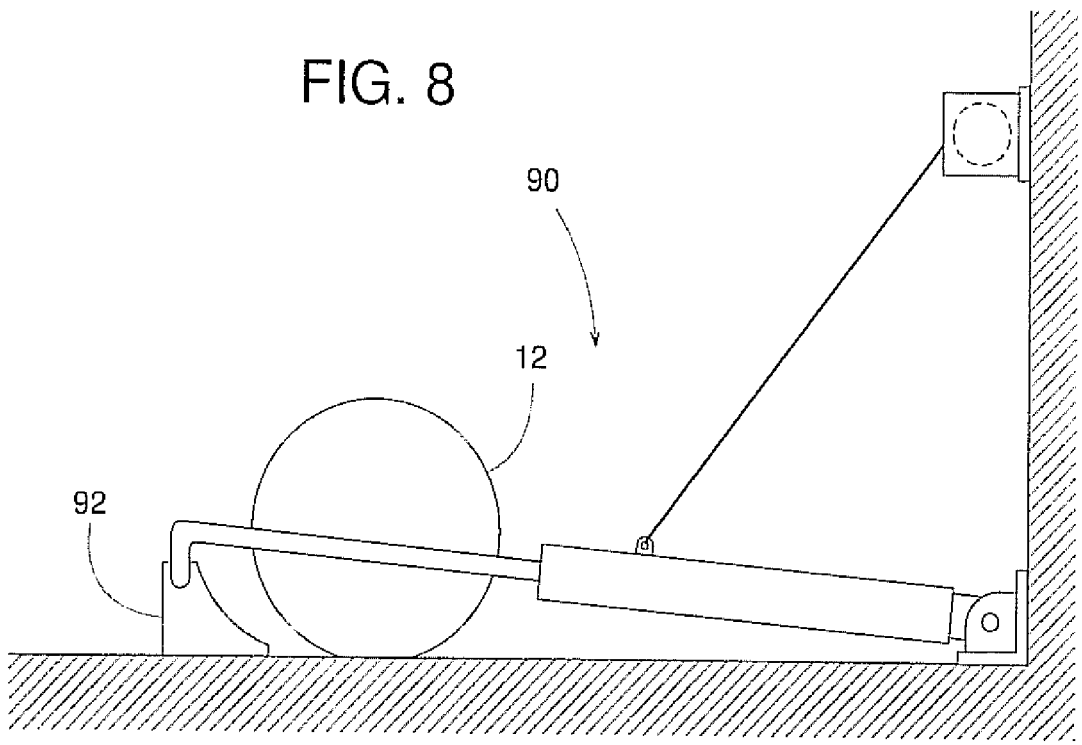
FIG. 8 is a side view of the example wheel restraint of FIG. 6 but showing the wheel chock adjacent a wheel.
Figure 9:
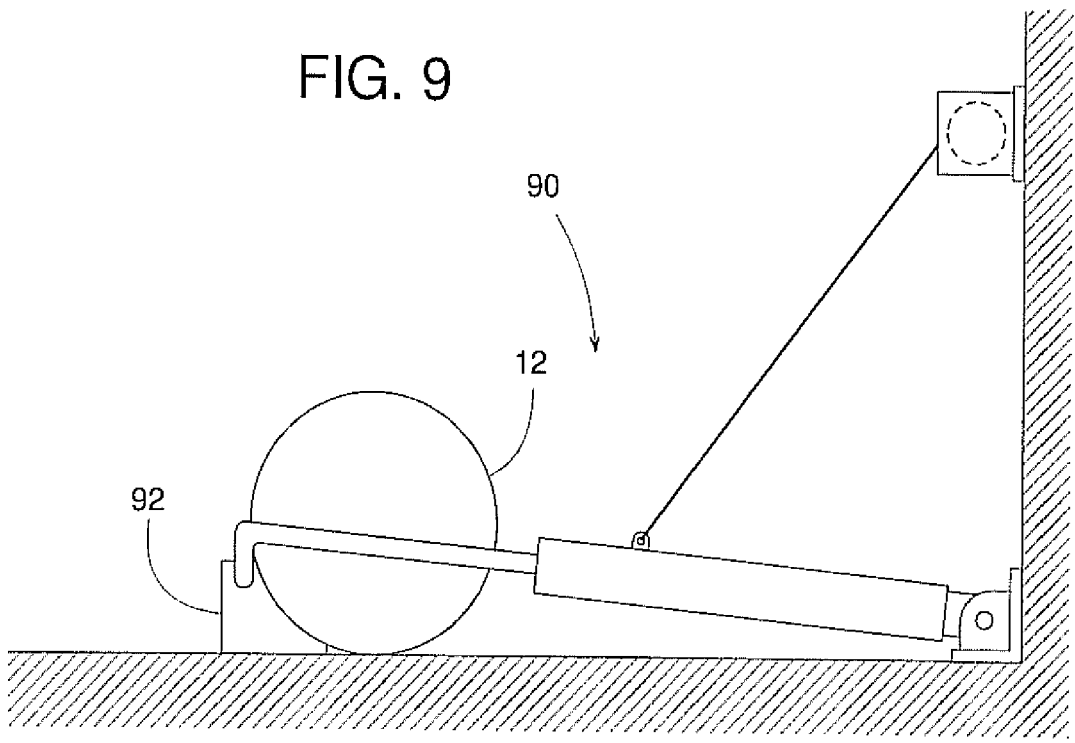
FIG. 9 is a side view of the example wheel restraint of FIG. 6 but showing the wheel chock snugly up against the wheel.
Figure 10:
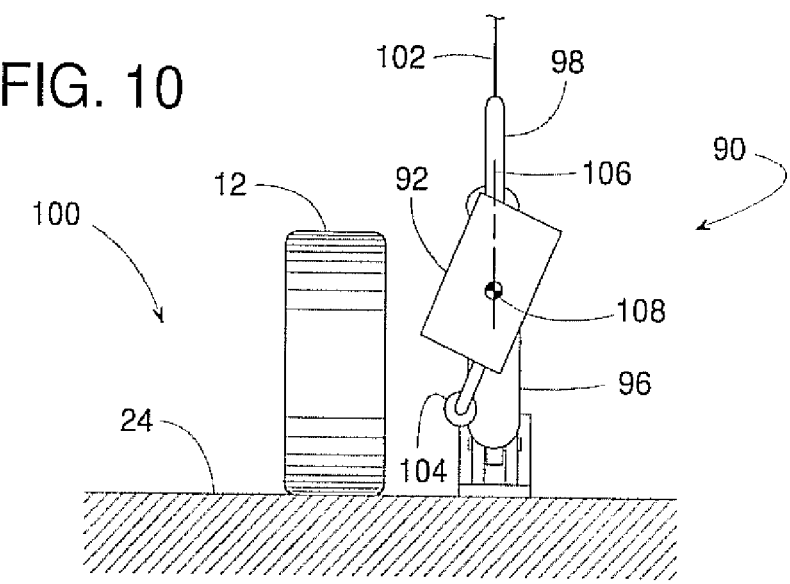
FIG. 10 is an end view of the example wheel restraint of FIG. 6 showing the wheel chock in a release position.
Figure 11:
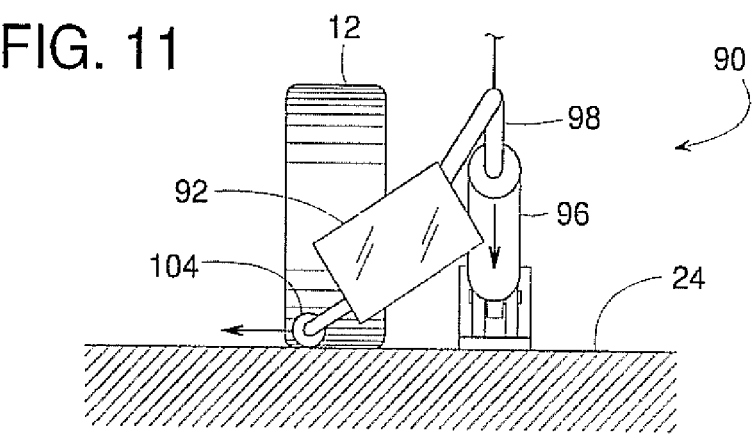
FIG. 11 is an end view of the example wheel restraint of FIG. 6 but showing the wheel chock being moved to a blocking position.
Figure 12:
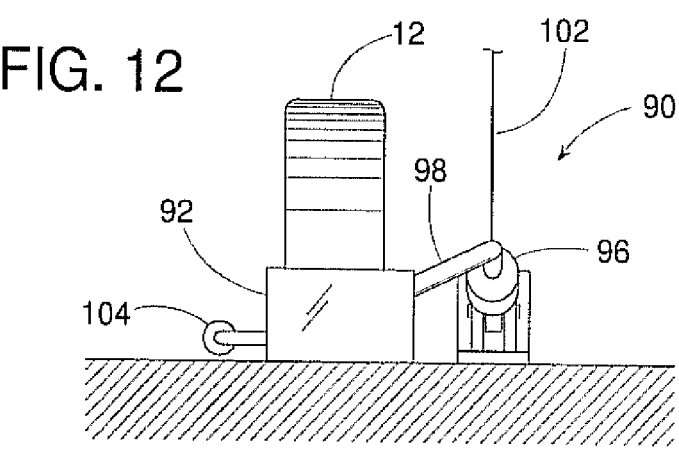
FIG. 12 is an end view of the example wheel restraint of FIG. 8.

In other examples, shown in FIGS. 6-12, a wheel restraint 90 includes a wheel chock 92 attached or coupled to the end of an arm 94 that is axially extendible. In the illustrated example, arm 94 is a hydraulic or other type of extensible cylinder 96 having a piston rod 98. To block wheel 12 at a loading dock 100, in this example a manual or powered winch 36 operatively coupled to the arm 94 via, for example, a cable 102, lowers arm 94 from its position of FIGS. 6 and 10, so that friction-reducing structure, illustratively in the form of a roller 104 or sliding edge of chock 92, engages driveway 24, as shown in FIGS. 7 and 11. Since rod 98 and its piston is free to rotate within cylinder 96 and since roller 104 is offset to a longitudinal centerline 106 of cylinder 96 (FIG. 10), further lowering of arm 94 urges roller 104 to guide chock 92 in front of wheel 12, as shown in FIGS. 11 and 12. Once chock 92 is directly in front of wheel 12, arm 94 can retract to pull chock 92 from its position of FIG. 8 to that of FIG. 9. The extension of arm 94 can then be locked hydraulically to firmly block movement (e.g., forward movement) of wheel 12.

To release wheel 12, arm 94 first extends to move chock 92 away from wheel 12. Winch 36 then lifts arm 94 and chock 92 upward. As chock 92 is lifted, the chock's center-of-gravity 108 causes it to swing clear of wheel 12, as shown in FIG. 10.

Various components of restraints 10, 66 and 90 can be combined or interchanged to create other examples. Such components include, but are not limited to, anchors 32 and 84; arms 30, 68 and 94; chocks 20, 22 and 92; spring 34 and winch 36; and holding mechanisms 46 and 70. For example, roller 104 of FIGS. 6, 7, and 10-12 may be replaced by roller 44' of FIG. 3A.

At least some of the aforementioned examples include one or more features and/or benefits including, but not limited to, the following:

In some examples, a wheel restraint includes a wheel chock that automatically swings in front of the wheel as an arm simply lowers the chock vertically.

In some examples, a wheel restraint includes a manually movable arm that not only helps position a wheel chock but also transmits a wheel-reacting force to a fixed anchor.

In some examples, a winch moves a wheel chock selectively in and out of position.

In some examples, a manual collet clamp helps hold a wheel chock in position.

In some examples, a wheel chock is stored in an elevated position to keep a loading dock's driveway clear when the chock is not in use.

In some examples, a manual chock includes a roller that helps in moving the chock into position.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

The invention claimed is:

1. A wheel restraint to engage a wheel of a vehicle at a loading dock, the wheel restraint system comprising:
an anchor mountable to the loading dock;
an arm defining a longitudinal axis and comprising a proximal end and a distal end, the proximal end being pivotally coupled to the anchor to enable the distal end of the arm to move substantially vertically between a generally vertical storage position substantially parallel relative to the dock face and an extended position substantially perpendicular relative to the dock face;

a wheel chock rotatably coupled to the arm such that the wheel chock rotates about the longitudinal axis of the arm to selectively move the chock between a blocking position and a release position such that:
 a) in the blocking position, the wheel chock obstructs the wheel,
 b) in the release position, the wheel chock is clear of the wheel, and
 c) in the release position, the wheel chock is translatable in a direction generally parallel to the longitudinal axis; and a lift mechanism for offsetting a weight of the arm and the wheel chock to facilitate movement of the distal end of the arm.

2. The wheel restraint of claim 1, further comprising a roller coupled to the wheel chock, wherein the roller is rotatable about an axis that is substantially perpendicular to the longitudinal axis to facilitate longitudinal movement of the wheel chock.

3. The wheel restraint of claim 1, wherein the arm comprises a hydraulic cylinder.

4. The wheel restraint of claim 3, wherein the wheel chock is coupled to a piston rod of the hydraulic cylinder, and wherein the piston rod rotates relative to the hydraulic cylinder to move the chock between the blocking position and the release position.

5. The wheel restraint of claim 1, further comprising a collet clamp disposed on the arm, the collet clamp being selectively configurable between a clamped state and an unclamped state such that:
 a) in the clamped state, the collet clamp helps hold the wheel chock at a fixed location relative to the arm, and
 b) in the unclamped state, the collet clamp allows wheel chock to move generally parallel to the longitudinal axis.

6. The wheel restraint of claim 1, wherein the arm is axially extendable between an extended length and retracted length, and further comprising a length-fixing mechanism disposed on the arm to selectively fix the length of the arm, the length-fixing mechanism is selectively configurable between a locked state and an unlocked state such that:
 a) in the locked state, the length-fixing mechanism helps hold the arm selectively at one of plurality of discrete positions between the extended length and the retracted length, and
 b) in the unlocked state, the length-fixing mechanism allows the arm to move between the retracted length and the retracted length.

7. The wheel restraint of claim 6, wherein the length-fixing mechanism comprises a detent mechanism.

8. The wheel restraint of claim 1, wherein the lift mechanism comprises a winch.

9. The wheel restraint of claim 1, wherein the lift mechanism comprises a counterbalance spring.

10. The wheel restraint of claim 1, wherein the wheel chock is lower in the blocking position than in the release position.

11. The wheel restraint of claim 1, wherein the loading dock includes a wheel-supporting driveway upon which the wheel chock rests when in the blocking position, and the wheel chock includes a friction-reducing structure which engages the driveway to facilitate rotation of the wheel chock about the longitudinal axis.

12. A wheel restraint to engage a wheel of a vehicle at a loading dock, the wheel restraint system comprising:
 an anchor mountable to the loading dock;
 an arm defining a longitudinal axis and comprising a proximal end and a distal end, the proximal end is pivotally coupled to the anchor such that the arm pivots to selectively raise and lower the distal end of the arm; and
 a wheel chock rotatably coupled relative to the arm and being selectively rotatable about the longitudinal axis between a blocking position and a release position such that:
  a) in the blocking position, the wheel chock obstructs the wheel,
  b) in the release position, the wheel chock is clear of the wheel,
  c) in the release position, the wheel chock is translatable in a direction generally parallel to the longitudinal axis, and
  d) in the release position, the wheel chock is rotatable about the longitudinal axis of the arm.

13. The wheel restraint of claim 12, further comprising a roller coupled to the wheel chock, wherein the roller is rotatable about an axis that is substantially perpendicular to the longitudinal axis to facilitate longitudinal movement of the wheel chock.

14. The wheel restraint of claim 12, wherein the arm comprises a hydraulic cylinder.

15. The wheel restraint of claim 12, further comprising a collet clamp disposed on the arm, the collet clamp is selectively configurable between a clamped state and an unclamped state such that:
 a) in the clamped state, the collet clamp helps hold the wheel chock at a fixed location relative to the arm, and
 b) in the unclamped state, the collet clamp allows wheel chock to move generally parallel to the longitudinal axis.

16. The wheel restraint of claim 12, wherein the arm is axially extendable between an extended length and retracted length, and further comprising a length-fixing mechanism disposed on the arm to selectively fix its length, the length-fixing mechanism is selectively configurable to a locked state and an unlocked state such that:
 c) in the locked state, the length-fixing mechanism helps hold the arm selectively at one of plurality of discrete positions between the extended length and the retracted length, and
 d) in the unlocked state, the length-fixing mechanism allows the arm to move between the retracted length and the retracted length.

17. The wheel restraint of claim 16, wherein the length-fixing mechanism is a detent mechanism.

18. The wheel restraint of claim 12, further comprising a winch coupled to the arm, wherein the winch helps support at least some weight of the arm.

19. The wheel restraint of claim 12, further comprising a counterbalance spring coupled to the arm, wherein the counterbalance spring helps support at least some weight of the arm.

20. The wheel restraint of claim 12, wherein the loading dock includes a wheel-supporting driveway upon which the wheel chock rests when in the blocking position, and the wheel chock includes a friction-reducing structure which engages the driveway to facilitate rotation of the wheel chock about the longitudinal axis.

21. The wheel restraint of claim 12, wherein the arm is to pivot relative to the anchor between a generally vertical stored position relative to a dock face or wall of the loading dock and an extended position to position the chock adjacent a wheel of a vehicle when the vehicle is at the loading dock.

22. A method of chocking a wheel of a vehicle at a loading dock, the method comprising:
supporting a wheel chock at a variable axial position relative to a pivotal arm having a longitudinal axis;
axially adjusting the variable axial position of the wheel chock by adjusting an axial length of the pivotal arms;
rotating the wheel chock relative to the arm about the longitudinal axis of the arm to selectively install and remove the wheel chock relative to the wheel;
locking the wheel chock against axial movement when the wheel chock is installed in a blocking position relative to the wheel.

23. The method of claim 22, wherein adjusting the variable axial position of the wheel chock is done manually.

24. The method of claim 22, further comprising manually pivoting the pivotal arm.

25. The method of claim 22, further comprising manually locking the wheel chock to the pivotal arm to help hold the wheel chock at a selected axial position.

26. The method of claim 25, wherein adjusting the axial length of the pivotal arm is done manually.

27. The method of claim 22, wherein adjusting the axial length of the pivotal arm is done hydraulically.

28. A method of chocking a wheel of a vehicle at a loading dock, the method comprising:
supporting a wheel chock at a variable axial position relative to a pivotal arm having a longitudinal axis;
axially adjusting the variable axial position of the wheel chock;
rotating the wheel chock relative to the arm about the longitudinal axis of the arm to selectively install and remove the wheel chock relative to the wheel, wherein rotating the wheel chock about the longitudinal axis of the arm involves rolling a roller that is coupled to the wheel chock; and
locking the wheel chock against axial movement when the wheel chock is installed in a blocking position relative to the wheel.

29. A method of chocking a wheel of a vehicle at a loading dock, the method comprising:
supporting a wheel chock at a variable axial position relative to a pivotal arm having a longitudinal axis;
pivoting the arm between a generally vertical stored position relative to a wall of the loading dock and an extended position to position the chock adjacent the wheel;
axially adjusting the variable axial position of the wheel chock;
rotating the wheel chock relative to the arm about the longitudinal axis of the arm to selectively install and remove the wheel chock relative to the wheel; and
locking the wheel chock against axial movement when the wheel chock is installed in a blocking position relative to the wheel.

* * * * *

UNITED STATES PATENT AND TRADEMARK OFFICE
CERTIFICATE OF CORRECTION

PATENT NO. : 8,464,846 B2
APPLICATION NO. : 12/042191
DATED : June 18, 2013
INVENTOR(S) : Andersen et al.

Page 1 of 1

It is certified that error appears in the above-identified patent and that said Letters Patent is hereby corrected as shown below:

In the Claims

Column 5, line 52 (claim 6), delete "retracted" and insert --extended--.
Column 6, line 48 (claim 16), delete "retracted" and insert --extended--.
Column 7, line 8 (claim 22), delete "arms" and insert --arm--.
Column 7, line 22 (claim 26), delete "claim 25" and insert --claim 22--.

Signed and Sealed this
Twenty-second Day of October, 2013

Teresa Stanek Rea
*Deputy Director of the United States Patent and Trademark Office*